(12) United States Patent
Gadgil

(10) Patent No.: US 7,820,052 B2
(45) Date of Patent: Oct. 26, 2010

(54) METHOD OF ARSENIC REMOVAL FROM WATER

(75) Inventor: Ashok Gadgil, El Cerrito, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 12/467,927

(22) Filed: May 18, 2009

(65) Prior Publication Data
US 2009/0301971 A1 Dec. 10, 2009

Related U.S. Application Data

(62) Division of application No. 11/065,867, filed on Feb. 24, 2005, now Pat. No. 7,544,636.

(60) Provisional application No. 60/550,688, filed on Mar. 4, 2004, provisional application No. 60/653,073, filed on Feb. 14, 2005.

(51) Int. Cl.
*C02F 1/28* (2006.01)
(52) U.S. Cl. .................... 210/688; 210/912
(58) Field of Classification Search ........... 210/681, 210/683, 684, 688, 911, 912; 502/406
See application file for complete search history.

(56) References Cited

U.S. PATENT DOCUMENTS

| | | |
|---|---|---|
| 4,046,687 A | 9/1977 | Schulze |
| 4,112,063 A | 9/1978 | Buxbaum et al. |
| 4,366,128 A | 12/1982 | Weir et al. |
| 5,043,080 A | 8/1991 | Cater et al. |
| 5,075,010 A | 12/1991 | Zhang |
| 5,369,072 A | 11/1994 | Benjamin et al. |
| 5,556,545 A | 9/1996 | Volcher et al. |
| 5,603,838 A | 2/1997 | Misra et al. |

(Continued)

FOREIGN PATENT DOCUMENTS

CA 1 067 627 A1 12/1979

(Continued)

OTHER PUBLICATIONS

"Berkeley Lab Currents" url: http://www.lbl.gov/Publications/Currents/Archive/Dec-03-2004.html retrieved on Jun. 12, 2005, 18 pp.

(Continued)

*Primary Examiner*—Matthew O Savage
(74) *Attorney, Agent, or Firm*—Townsend and Townsend and Crew LLP

(57) ABSTRACT

A method for low-cost arsenic removal from drinking water using chemically prepared bottom ash pre-treated with ferrous sulfate and then sodium hydroxide. Deposits on the surface of particles of bottom ash form of activated iron adsorbent with a high affinity for arsenic. In laboratory tests, a miniscule 5 grams of pre-treated bottom ash was sufficient to remove the arsenic from 2 liters of 2400 ppb (parts per billion) arsenic-laden water to a level below 50 ppb (the present United States Environmental Protection Agency limit). By increasing the amount of pre-treated bottom ash, even lower levels of post-treatment arsenic are expected. It is further expected that this invention supplies a very low-cost solution to arsenic poisoning for large population segments.

5 Claims, 4 Drawing Sheets

U.S. PATENT DOCUMENTS

| | | | |
|---|---|---|---|
| 5,635,073 | A | 6/1997 | Aktor et al. |
| 5,858,249 | A | 1/1999 | Higby |
| 6,042,731 | A | 3/2000 | Bonnin et al. |
| 6,197,201 | B1 | 3/2001 | Misra et al. |
| 6,200,482 | B1 | 3/2001 | Winchester et al. |
| 6,248,241 | B1 | 6/2001 | Christensen et al. |
| 6,613,230 | B2 | 9/2003 | Krulik et al. |
| 6,824,690 | B1 | 11/2004 | Zhao et al. |
| 6,914,034 | B2 | 7/2005 | Vo |
| 2002/0003116 | A1 | 1/2002 | Golden |
| 2002/0036172 | A1 | 3/2002 | Del Signore |
| 2002/0113023 | A1 | 8/2002 | Krulik et al. |
| 2003/0116504 | A1 | 6/2003 | Vempati |
| 2003/0183579 | A1 | 10/2003 | Bandyopadhya et al. |
| 2004/0089608 | A1 | 5/2004 | Vo |
| 2004/0101971 | A1 | 5/2004 | Voice et al. |
| 2004/0108275 | A1 | 6/2004 | Shaniuk |
| 2005/0059549 | A1 | 3/2005 | Vo |

FOREIGN PATENT DOCUMENTS

| | | |
|---|---|---|
| WO | WO 2004/064078 A2 | 7/2004 |
| WO | WO 2006/116421 A1 | 11/2006 |

OTHER PUBLICATIONS

Ali et al. "Development of Low-Cost Technologies for Removal of Arsenic from Groundwater," Bangladesh University of Engineering (Bangladesh), p. 99-120, (May 16, 2001).

Apyron Techonlogies "Apyron Technologies and the University and the University of Houston Awarded Grant for Arsenic Removal Program," Air and Water Treatment Solutions, www.apvron.com/news_a1.thml (US), p.1, (Jun. 28, 1999).

Blue Planet Run Foundation, "The Arsenic Removal Project," www.blueplanetrun.org, p. 1-6, (Jan. 1, 2004).

Clayton, Mark, "A race to fix a 30-year-old 'solution'" Water Conserve, Feb. 17, 2005, url: http://www.waterconserve.info/articles/reader.asp?linkid=39318, p. 1-4.

Clifford, Dennis "Anion Exchange with Chloride-form Strong-Base Resins," http://web.mit.edu/murcott/www.arsenic/templates/14UHouston.htm, Univ of Houston (US), p. 1-2, (Feb. 14, 2005).

Das et al. "A Simple Household Device to Remove Arsenic from Groundwater and Two Years Performance Report of Arsenic Removal Plant for Treating Groundwater with Community Participation," School of Environmental Studies, Jadavpur University, Calcutta-700 032, India. pp. 231-250.

Database Biosis 'Online! Biosciences Information Service, Philadelphia, PA, US; Sep. 2002, Lin Chiu-Yue et al. "Removal of pollutants from wastewater by coal bottom ash." XP002331129 Database accession No. PREV200300040842 abstract and Journal of Enviromental Science and Health Part a Toxic-Hazardous Substances and Environmental Engineering, vol. A37, No. 8, Sep. 2002, pp. 1509-1522, ISSN: 1093-4529.

Edwards et al, "Adsorptive Filtration Using Coated Sand: A New Approach for Treatment of Metal-Bearing Wastes," Journal WPCF, vol. 61, p. 1523-33, (Sep. 1, 1989).

Gadgil et al. "Arsenic Removal from Drinking Water," Lawrence Berkeley National Lab (US), p. 1-11. (Feb. 1, 2004).

Gilles et al. "Arsenic Reduction Challenges in India and Bangladesh," Water Conditioning & Purification, p. 1-3, (Jun. 1, 2000).

Joshi et al. "Removal of Arsenic from Ground Water by Iron Oxide-Coated Sand," Journal of Environmental Engineering, p. 769-711, (Aug. 1, 1996).

Krotz, Dan "Water Filter Could Help Millions of Bangladeshis," Research News, url: http://www.lbl.gov/Science-Articles/Archive/EETD-Gadgil-water-filter.html, Dated Jan. 21, 2005; retrieved on Apr. 22, 2005, pp. 1-3.

Lawrence Berkeley National Laboratory, "Environmental Energy Technologies Division; *News*," 2005, vol. 6, No. 1, pp. 1-12.

McMullin et al. "High-Efficienciency Low-Cost Arsenic Adsorbent for Drinking Water," ADI International, Inc. (Canada), p. 1-9, (Mar. 1, 2004).

Meima et al. "Reducing Sb-leaching from municipal solid waste incinerator bottom ash by addition of sorbent materials," J. of Geochemical Exploration 62 (Elsevier, 1998), 299-304.

Patoczka HMM, Jurek, et al. "Trace Heavy Metals Removal with Ferric Chloride," Presented at Water Environment Federation Industrial Wastes Technical Conference, Nashville, TN, 1998, 14 pp.

Pescovitz, David. "Community Water Works," Lab Notes, url: http://www.coe.berkeley.edu/labnotes/0405/gadgil.html, Dated Apr. 2005; retrieved on Apr. 22, 2005, pp. 1-3.

Tang-Quan, Sharon, "Clear Water for Bangladesh," Sci-Tech, www.dailycal.org, The Daily Californian (US), p. 1-2, (Feb. 2, 2005).

Thirunavukkarasu et al. "Removal of Arsenic in Drinking Water by Iron Oxide-Coated Sand and Ferrihydrite-Batch Studies," Water Qual. Res J. Canada, vol. 36 (No. 1), p. 55-70, (Apr. 11, 2001).

U.S. Appl. No. 11/912,104; filed Oct. 19, 2007; Entitled: Composition and Methods for Removing Arsenic From Water; Inventors: Gadgil, et al.

Schweitzer, P., "Corrosion-Resistant Linings and Coatings," *Marcel Dekker, Inc.*, p. 266 (2001).

Report on Ernest Orlando Lawrence Laboratory: Laboratory Directed Research and Development Program, pp. (v) and 42.

Office Action mailed May 4, 2010 in U.S. Appl. No. 11/912,104.

METHOD OF ARSENIC REMOVAL FROM WATER

CROSS REFERENCE TO RELATED APPLICATIONS

This application is a divisional of U.S. patent application Ser. No. 11/065,867 filed on Feb. 24, 2005, now U.S. Pat. No. 7,544,636, and claims benefit of priority from U.S. provisional patent application Ser. No. 60/550,668 filed Mar. 4, 2004, entitled "Arsenic Removal from Drinking Water Using Treated Bottom Ash", and U.S. provisional patent application 60/653,073 filed Feb. 14, 2005, entitled "Arsenic Removal from Drinking Water Using Treated Bottom Ash", both of which are hereby incorporated by reference in their entireties.

STATEMENT REGARDING FEDERAL FUNDING

This invention was made with U.S. Government support under Contract Number DE-AC03-76SF00098 between the U.S. Department of Energy and The Regents of the University of California for the management and operation of the Lawrence Berkeley National Laboratory. The U.S. Government has certain rights in this invention.

REFERENCE TO A COMPUTER PROGRAM

Not Applicable.

BACKGROUND OF THE INVENTION

1. Field of the Invention

The present invention generally relates to arsenic removal from drinking water, and more specifically relates to arsenic removal from drinking water using treated bottom ash.

2. Description of the Relevant Art

U.S. Pat. No. 6,042,731, by Dagmar Bonnin, entitled "Method of Removing Arsenic Species from an Aqueous Medium Using Modified Zeolite Material", incorporated herein by reference, discloses a method for treatment of arsenic-laden drinking water using zeolites. However, zeolites are expensive, and not economically viable for populations living in poverty. The patent also discloses the use of $FeSO_4$-treated fly ash for removal, however, fly ash is an important, and hence expensive, industrial commodity used in a variety of chemical processes, e.g., in the manufacture of cement. The treatment of bottom ash is not disclosed in said patent, nor is pretreatment with ultraviolet light exposure to modify the aqueous Arsenic to a higher valence state $As^{3+}$ to $As^{5+}$ so as to increase adsorption of the specie.

BRIEF SUMMARY OF THE INVENTION

This invention provides for a method for arsenic impurity removal from drinking water, the method comprising: a) collecting bottom ash; b) treating said bottom ash with $FeSO_4$ solution; and c) then treating said bottom ash with NaOH solution. The initial collected bottom ash may be first washed to remove impurities. Also, said bottom ash may have a further step of further washing the bottom ash after treatment with the NaOH solution.

The treated bottom ash above may further comprise the step of oxidizing said bottom ash. The oxidizing step may be performed by air drying, addition of hydrogen peroxide, potassium permanganate ($KMnO_4$), bubbled air, sodium hypophosphite ($NaH_2PO_2.H_2O$), hydrogen peroxide ($H_2O_2$), or other similar oxidizing agent. Additionally, nonoxidizing agents such as $FeSO_4$ may provide a color center for absorption of ultraviolet light. Such absorbed photons provide energy for the surface oxidation of the coated bottom ash from an $Fe(OH)_2$ state to an $Fe(OH)_3$ state in the aqueous solution. These states are readily discernable by the yellowish to greenish patina of the $Fe(OH)_2$ compared to the rust colored state of $Fe(OH)_3$. When the treated bottom ash is coated with the $Fe(OH)_3$, it is ready to act as an adsorbent material for impurities in a water source, such as arsenic or possibly other heavy metals.

After said treated bottom ash has been prepared and oxidized, one may begin removing arsenic impurities from a quantity of water using said treated, dried bottom ash. The removing step is typically performed by adsorbing arsenic ions from a quantity of water in a form complexated with iron ions previously coated on the treated bottom ash surface.

The input quantity of water comprising aqueous arsenic ions may be enhanced by exposing said quantity of water to ultraviolet radiation sufficient to change said aqueous arsenic to a higher valence state, preferably in the presence of dissolved oxygen. The source of this oxygen is preferably from the atmosphere as in air drying, but can also be from bubbled air, or addition of hydrogen peroxide, potassium permanganate ($KMnO_4$), or sodium hypophosphite ($NaH_2PO_2.H_2O$). In this manner the valence level of arsenic may raised from $As^{3+}$ to $As^{5+}$. It is thought that the $As^{5+}$ valence state is more easily adsorbed.

BRIEF DESCRIPTION OF THE SEVERAL VIEWS OF THE DRAWINGS

The invention will be more fully understood by reference to the following drawings, which are for illustrative purposes only.

DETAILED DESCRIPTION OF THE PREFERRED EMBODIMENT

Definitions

Figure 1:
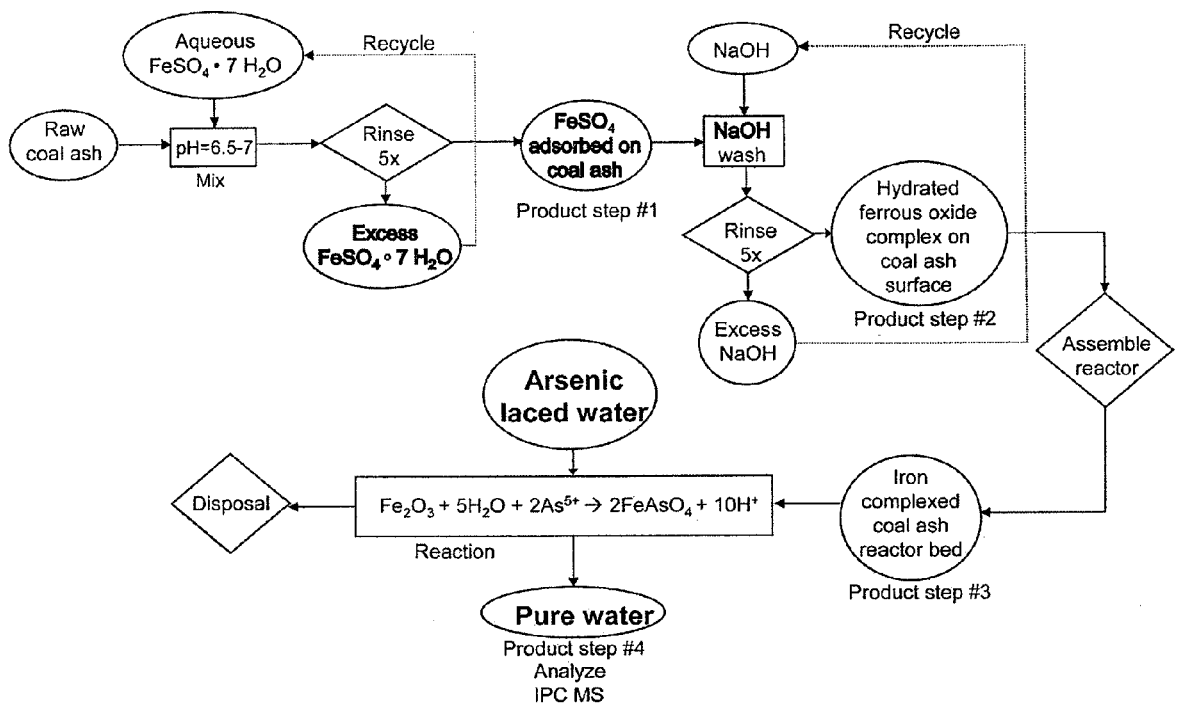
FIG. 1 is a flow chart of the pre-treatment and use steps of bottom ash for aqueous arsenic removal.

Bottom ash means the refuse left behind after partial or complete combustion of bituminous, anthracitic, or lignitic coal or wood, rice, rice husks, or other partially or completely combusted carbonaceous material.

Fly ash means "fine particulate, essentially noncombustible refuse, carried in a gas stream from a furnace", as defined in the *McGraw-Hill Dictionary of Scientific and Technical Terms, Fifth Edition*, McGraw-Hill, Inc., 1994.

Introduction

Arsenic poisoning is a painful, disfiguring, and permanent disease afflicting many millions of people world-wide. The invention described herein takes commonly available coal combustion byproduct ash, or bottom ash, pre-treats it with two relatively simple chemical process steps, and results with an adsorbent pre-treated bottom ash that is useful for removing arsenic and possibly other harmful heavy metals from drinking water. Since most of the bottom ash material occurs readily where people inhabit, treatment systems using this method have low transportation costs. Additionally, since processing costs are minimized, overall treatment costs are very low, and believed readily accessible to countries which have even very low per-capita income levels.

An example below details a laboratory procedure for preparation of the coated bottom ash.

Example 1

Preparation of 5 Grams of Pre-Treated Bottom Ash

Initially, 5 grams of dry bottom ash are placed in a holding container.

Approximately 30 ml of 0.6 Molar $FeSO_4$ is mixed with the bottom ash, and continuously stirred for an hour at near room temperature, e.g. 1040 degrees C. Although this is the room temperature saturation concentration of the $FeSO_4$, lower concentrations could be used for either lower bottom ash surface coverage, or lower quantities of bottom ash. It is possible that $FeSO_4$ concentrations could be usable from the range of 0.1 M or greater.

After stirring, the solid bottom ash particulate is allowed to settle to the bottom of the holding container for about 5 minutes. At this point, the surface liquid is removed, filtered, and the residue on the filter paper added to the dense mixture at the bottom of the holding container.

The holding container is then stirred with an aqueous solution of 9 ml of 0.5 N NaOH, and the contents mixed well for 5 minutes. It is thought that the NaOH processes the previous $FeSO_4$ into a complex ferrous state of $Fe(OH)_2$ according to the oxidation reduction chemical formula $FeSO_4 + 2NaOH \rightarrow Fe(OH)_2 + Na_2SO_4$, which forms an improved arsenic adsorbent.

Drain off the excess surface liquid after the solids are allowed to settle to the bottom of the holding container for about 5 minutes. At this point, the surface liquid is removed, leaving a dense processed mixture at the bottom of the holding container.

Spread the contents of the holding container on a filter paper, place in a Petri dish, and dry at room temperature in open air in a fume hood for a period of 36 hours. This serves the function of oxidizing the coated $Fe(OH)_2$ bottom ash to form a coated $Fe(OH)_3$ bottom ash, which has been found to be much better at adsorbing arsenic in water than the $Fe(OH)_3$ form.

Wash the dried material from the previous step three times using each time about 100 ml arsenic-free water to remove any non-adsorbed NaOH or $Fe(OH)_2$ solute. At the end of each wash, filter the supernatant, and add the residue on the filter paper back to the solids. At the end of the third wash, the solids are the prepared medium (adsorbent).

Use the adsorbent media in the following manner: add arsenic-laden water to the adsorbent, stir for a sufficient time to adsorb aqueous arsenic (typically about an hour), and then decant the liquid.

In laboratory test, the adsorbent medium was able to remove arsenic from 2000 ml of 2.4 ppm (parts per million, or alternatively 2400 parts per billion, ppb) arsenic laden water to bring the arsenic concentration to a level of 50 ppb or below, as described in FIG. 2.

Applied Use of the Pre-Treated Bottom Ash for Arsenic Removal

In practice, an arsenic laden water source is mixed with the coated $Fe(OH)_3$ coated bottom ash sufficiently to reduce the arsenic levels to an acceptable level. Presently, for the United States Environmental Protection Agency (US EPA), that level is 50 ppb, however, it will be reduced to 10 ppb beginning January 2006. The World Health Organization (WHO) has already announced that it recommends the provisional value for acceptable arsenic concentration in drinking water be changed to a lower limit to below 10 ppb.

Improved adsorption performance may be obtained by pre-treating the arsenic laden water with ultraviolet light, so as to change the state of the aqueous arsenic from $As^{3+} \rightarrow As^{5+}$. Normally, clear water allows ultraviolet light to pass through without absorption. However, with the addition of a color center source, such as $FeSO_4$, ultraviolet light will be absorbed, energizing the ions to change the arsenic valence state.

It should be noted that atmospheric, freely flowing water, usually contains an abundance of $As^{5+}$ due to the oxygen present in the water. However, well-borne water fails to have an oxygen source, hence is predominated by $As^{3+}$ state. It is also believed that the state change to the pentavalent state can be achieved through oxidation additives such as bubbled air, potassium permanganate ($KMnO_4$), sodium hypophosphite ($NaH_2PO_2 \cdot H_2O$), or hydrogen peroxide ($H_2O_2$). Such additives may be dry or aqueous based.

As with both of the two water sources above, arsenic is removed though adsorption of the arsenic ions onto the pre-treated bottom ash. At some point, most receptor sites are occupied by arsenic ions, precluding reaching the maximum acceptable level. At this point, the pre-treated bottom ash is disposed, and replaced with new pre-treated bottom ash.

It has been found experimentally that large oversupplies of coated $Fe(OH)_3$ bottom ash (amounts sufficient to normally treat 25 times more of $As^{5+}$) have successfully removed water borne arsenic to acceptable levels of 10 ppb or lower, even without raising the arsenic valence state to $As^{5+}$. Thus, it is possible to calculate whether it is more economical to use more media, or raise the arsenic valence level to the pentavalent state.

Refer now to FIG. 1, which shows the process flow for treatment of bottom ash to manufacture coated $Fe(OH)_3$ bottom ash. These steps follow those of Example 1 described above.

Figure 2:
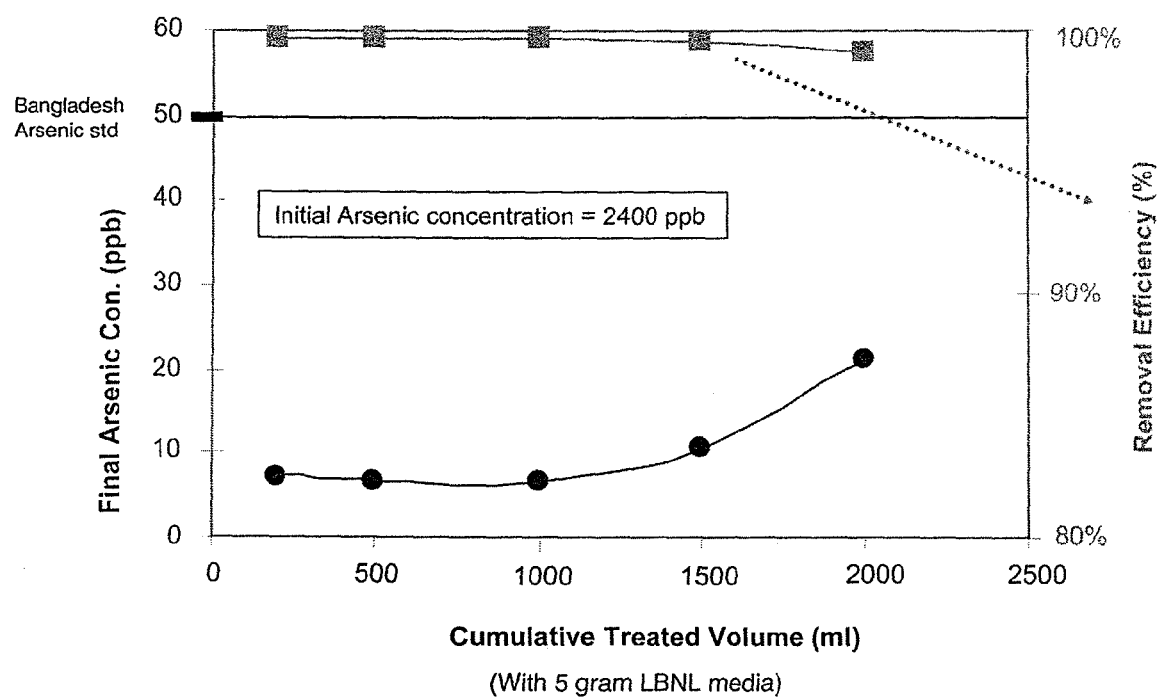
FIG. 2 is a chart of residual arsenic remaining after successive batches of 2400 parts per billion (ppb) arsenic-laden drinking water has been treated with the adsorbent treated bottom ash of this invention.

Refer now to FIG. 2. To give a sense of scale of the effectiveness of the coated $Fe(OH)_3$ bottom ash media, highly arsenic laden water having initial concentrations of 2400 ppb (or 240 times the proposed WHO limits) is sequentially input, and after mixing, tested for arsenic concentrations. Using only 5 g of coated $Fe(OH)_3$ bottom ash, the initial 2400 ppb water only exceeds the 10 ppb limit at a total treated volume of 1500 mL. It appears logical that a sequentially staged treatment system would bring the output arsenic levels to extremely low levels well below the proposed 10 ppb level.

Figure 3:
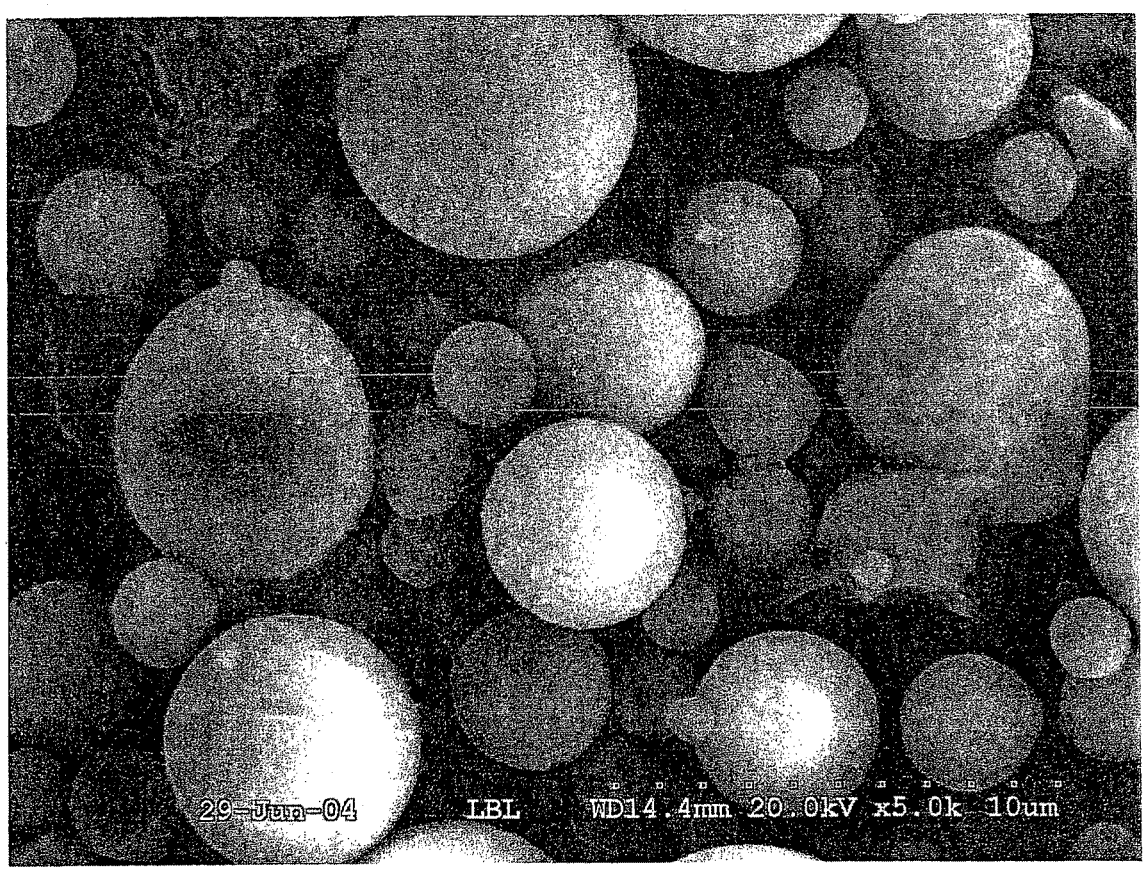
FIG. 3 is an electron micrograph of untreated bottom ash, showing a smooth bottom ash particle surface with a mixture of sizes from less than 1 µM to 10 µM diameter.

Refer now to FIG. 3, which shows uncoated bottom ash in an electron micrograph. The bottom ash particles vary in size, and tend to have a smooth surface.

Figure 4:
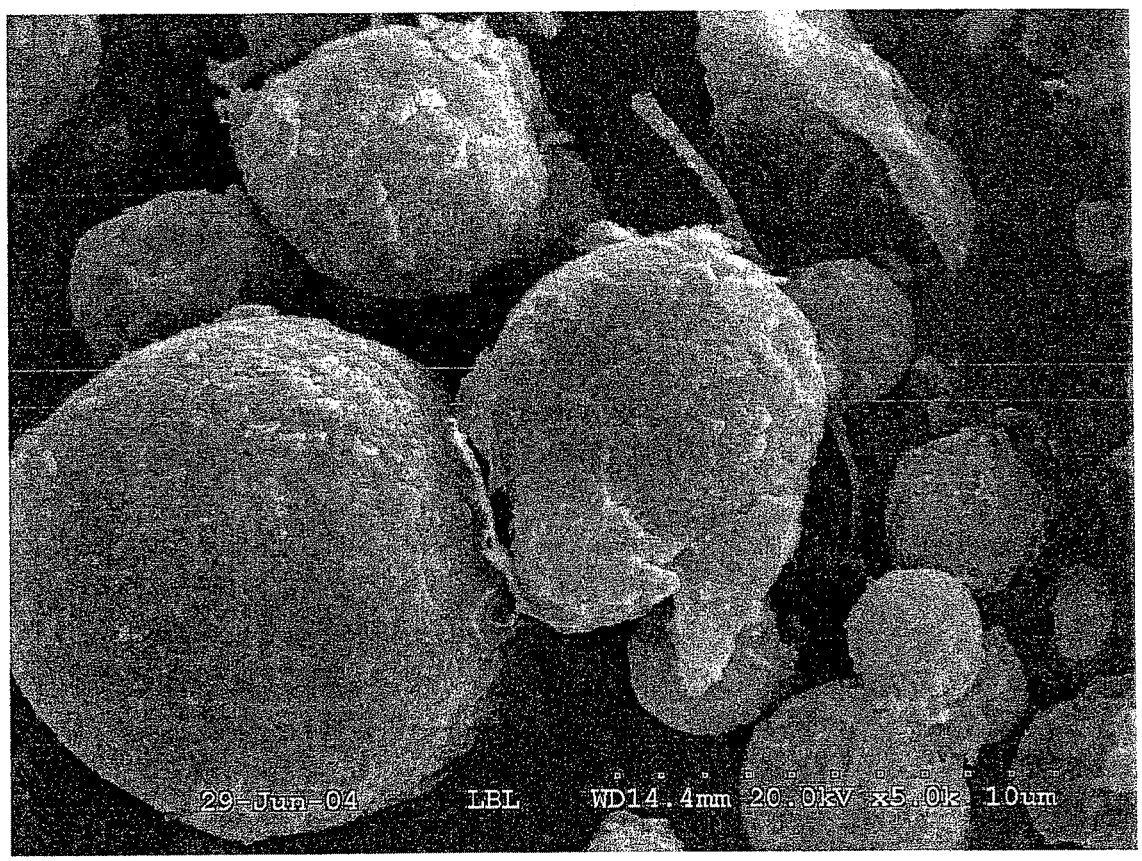
FIG. 4 is an electron micrograph of coated bottom ash, showing the $Fe(OH)_3$ coated bottom ash with a smooth to flaky surface appearance on particles of all sizes ranging from less than 1 µm to about 10 µm diameter, covering substantially all of the particulate surface.

Refer now to FIG. 4, which shows $Fe(OH)_3$ coated bottom ash. The nature of the coating is such that it appears to have one or more layers, and substantially covers each particle, regardless of size.

It should be noted that all of the discussions before have mixed the $Fe(OH)_3$ coated bottom ash in the arsenic laden water for arsenic removal. Alternative implementations could include a filter bag, with the arsenic laden water dripped though, or a percolation bed that has the water to be filtered passing through the bed. Additionally, any of these systems could be mixed or matched to provide for staged recovery of arsenic. Perhaps the easiest method is to mix the $Fe(OH)_3$ coated bottom ash with the arsenic laden water for a period of time by simple air bubbling. After ceasing air bubbling, the arsenic laden $Fe(OH)_3$ coated bottom ash should simply settle to the bottom, allowing water without arsenic to be withdrawn from the top.

CONCLUSIONS

All publications, patents, and patent applications mentioned in this specification are herein incorporated by reference to the same extent as if each individual publication or patent application were each specifically and individually indicated to be incorporated by reference.

The description given here, and best modes of operation of the invention, are not intended to limit the scope of the invention. Many modifications, alternative constructions, and equivalents may be employed without departing from the scope and spirit of the invention.

I claim:

1. A method of aqueous arsenic removal comprising:
   a) contacting an aqueous arsenic source with a coated $Fe(OH)_3$ bottom ash particle.

2. The method of claim 1, wherein the bottom ash is coated for arsenic removal in water by:
   a) mixing a quantity of bottom ash in a liquid comprising water to form a bottom ash suspension;
   b) treating said bottom ash suspension with an $FeSO_4$ aqueous solution to form a treated bottom ash suspension; and
   c) reacting said treated bottom ash suspension with a NaOH aqueous solution to form a coated $Fe(OH)_2$ bottom ash suspension.

3. The method of claim 2, comprising oxidizing said coated $Fe(OH)_2$ bottom ash suspension to form a coated $Fe(OH)_3$ bottom ash suspension.

4. A method for treating bottom ash for arsenic removal in water, comprising:
   a) providing a quantity of bottom ash;
   b) forming a coated $Fe(OH)_3$ bottom ash in suspension from said quantity of bottom ash; and
   c) contacting an aqueous arsenic source to said coated $Fe(OH)_3$ bottom ash in suspension.

5. A method for arsenic removal in water, comprising:
   a) providing a quantity of bottom ash;
   b) forming a coated $Fe(OH)_3$ bottom ash in suspension from said quantity of bottom ash;
   c) drying the bottom ash; and
   d) contacting arsenic containing water with the coated bottom ash.

* * * * *